C. W. GRAHAM.
SOLDERING MACHINE.
APPLICATION FILED APR. 16, 1910.

989,249.

Patented Apr. 11, 1911.

5 SHEETS—SHEET 1.

C. W. GRAHAM.
SOLDERING MACHINE.
APPLICATION FILED APR. 16, 1910.

989,249.

Patented Apr. 11, 1911.

5 SHEETS—SHEET 2.

WITNESSES:

INVENTOR
C. W. Graham,
BY
Wilson & Kent
ATTORNEYS.

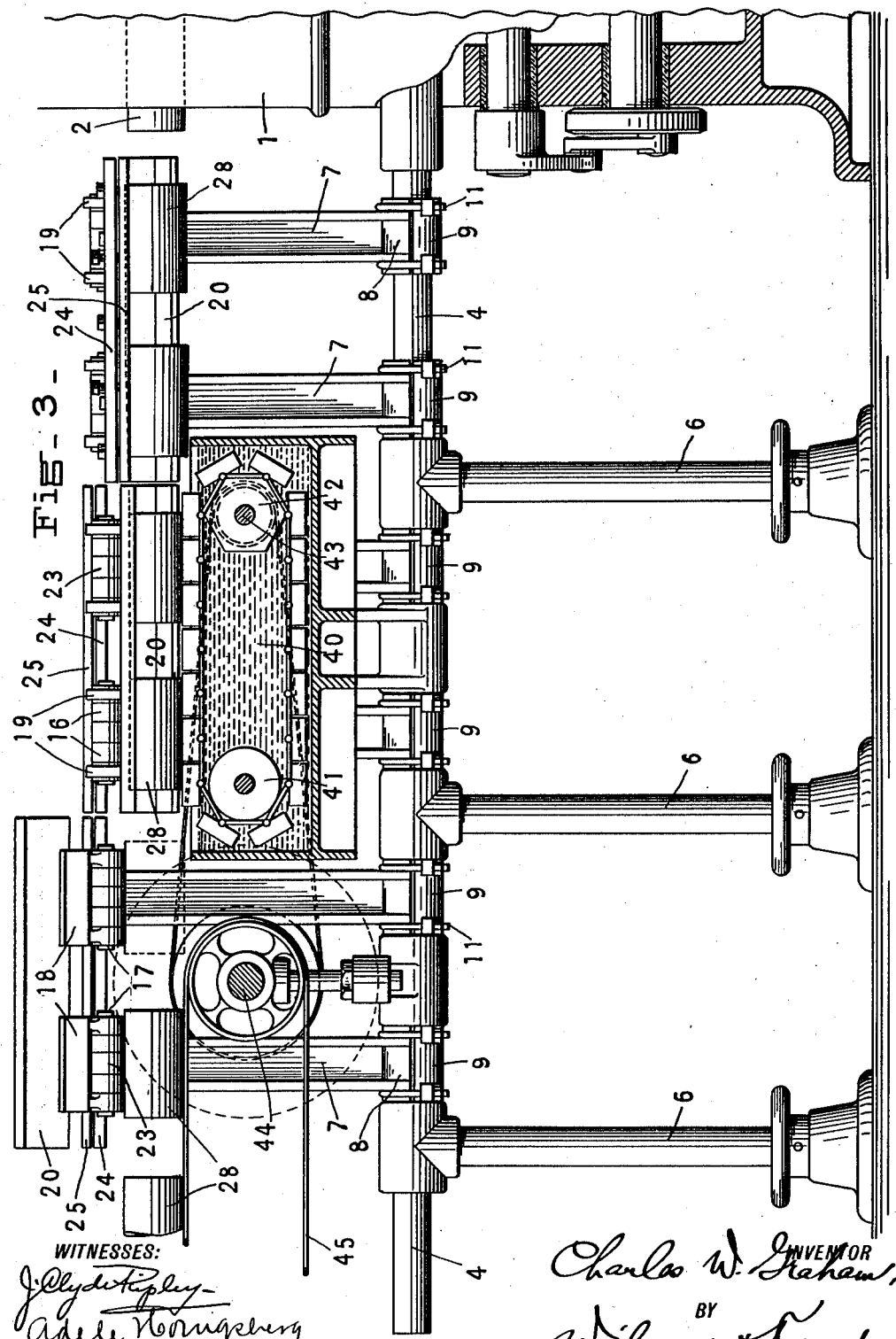

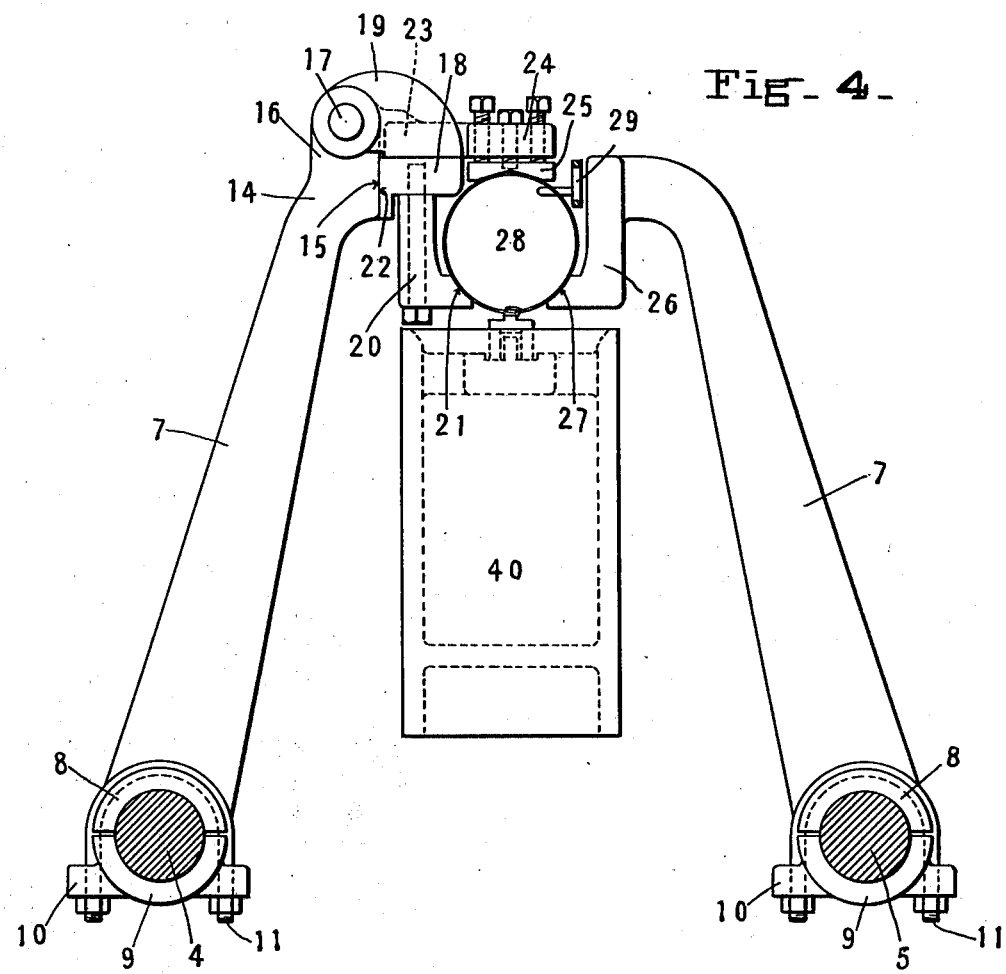
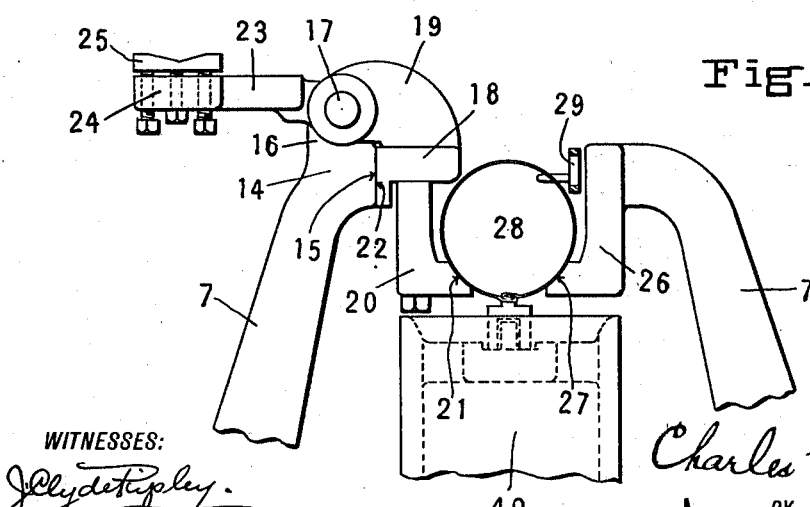

C. W. GRAHAM.
SOLDERING MACHINE.
APPLICATION FILED APR. 16, 1910.

989,249.

Patented Apr. 11, 1911.
5 SHEETS—SHEET 5.

WITNESSES:

INVENTOR,
Charles W. Graham,
BY
Wilson & Kent
ATTORNEYS.

UNITED STATES PATENT OFFICE.

CHARLES W. GRAHAM, OF ROME, NEW YORK, ASSIGNOR, BY MESNE ASSIGNMENTS, TO AMERICAN CAN COMPANY, OF NEW YORK, N. Y., A CORPORATION OF NEW JERSEY.

SOLDERING-MACHINE.

989,249.  Specification of Letters Patent.  Patented Apr. 11, 1911.

Application filed April 16, 1910. Serial No. 555,768.

*To all whom it may concern:*

Be it known that I, CHARLES W. GRAHAM, residing at Rome, in the county of Oneida, State of New York, have invented certain new and useful Improvements in Soldering-Machines, of which the following is a specification.

This invention relates to apparatus for use in making cans, and one of the objects thereof is to provide improved means for engaging the outside of a pre-shaped can body and holding it subject to the action of can treating devices, as, for instance, soldering means.
Another object of the invention is to provide an apparatus adapted to engage the outside of a can body and alter the shape of the same, preliminary to the operation thereon of can treating means.
Still another object of the invention is the provision of an apparatus for engaging the outside of a can body and temporarily altering the shape thereof, in combination with means for engaging the outside of the can body and holding it in its altered shape while it is subjected to the action of can treating means.

A further object is the provision, in serial arrangement, of means for engaging the outside of a can body and temporarily altering the shape thereof, in combination with means for engaging the outside of the can body and holding it in its altered shape while it is subjected to the action of can treating means, and other means for engaging the outside of the can body after treatment by the can treating means and causing it to resume its original shape.

Another object of the invention is to provide apparatus for engaging the outside of a can body to shape or hold the same, provided with a movable member which may be moved to permit of access to the can body engaged by the apparatus, or for other purposes.

Figure 1:
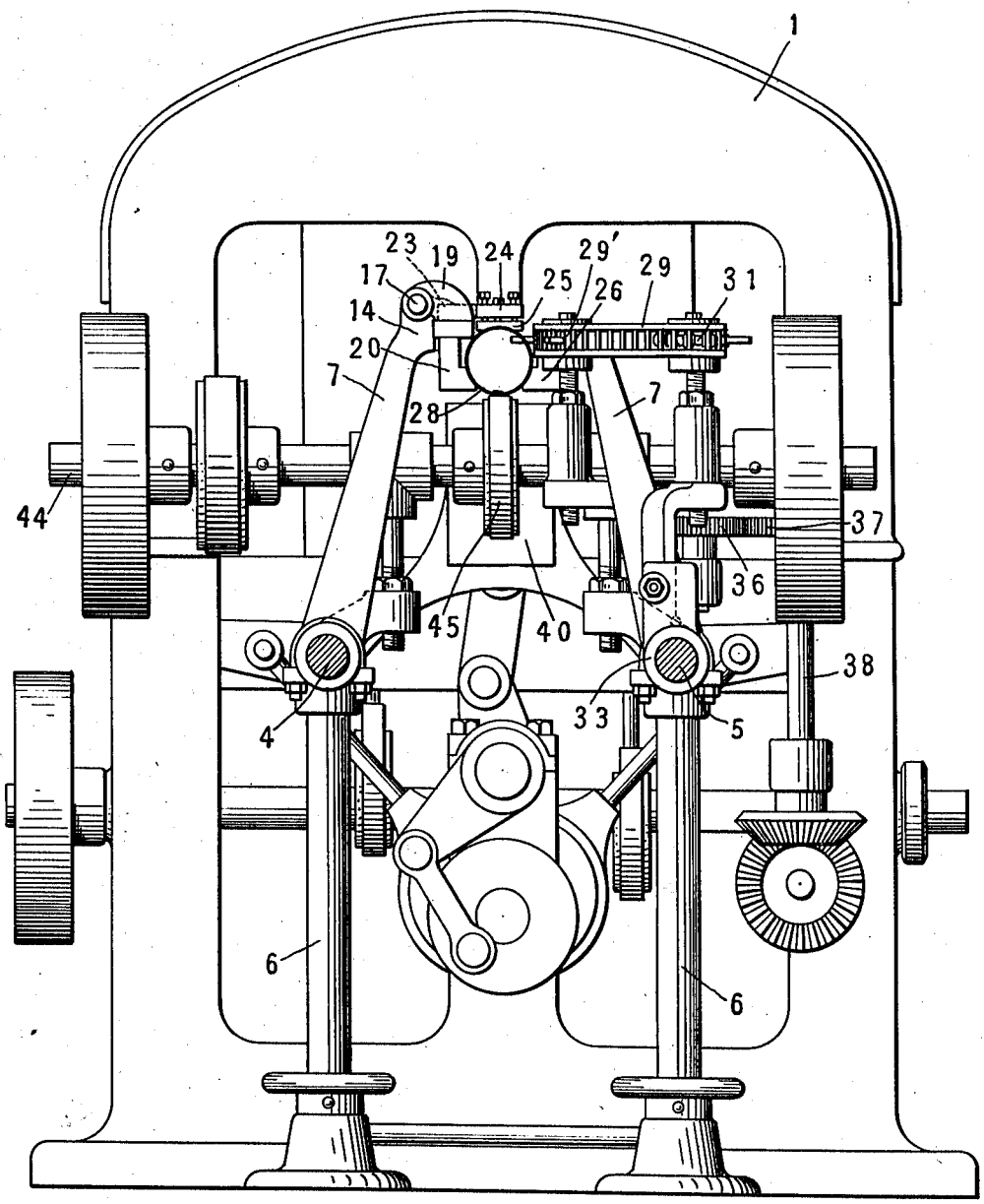
Figure 2:
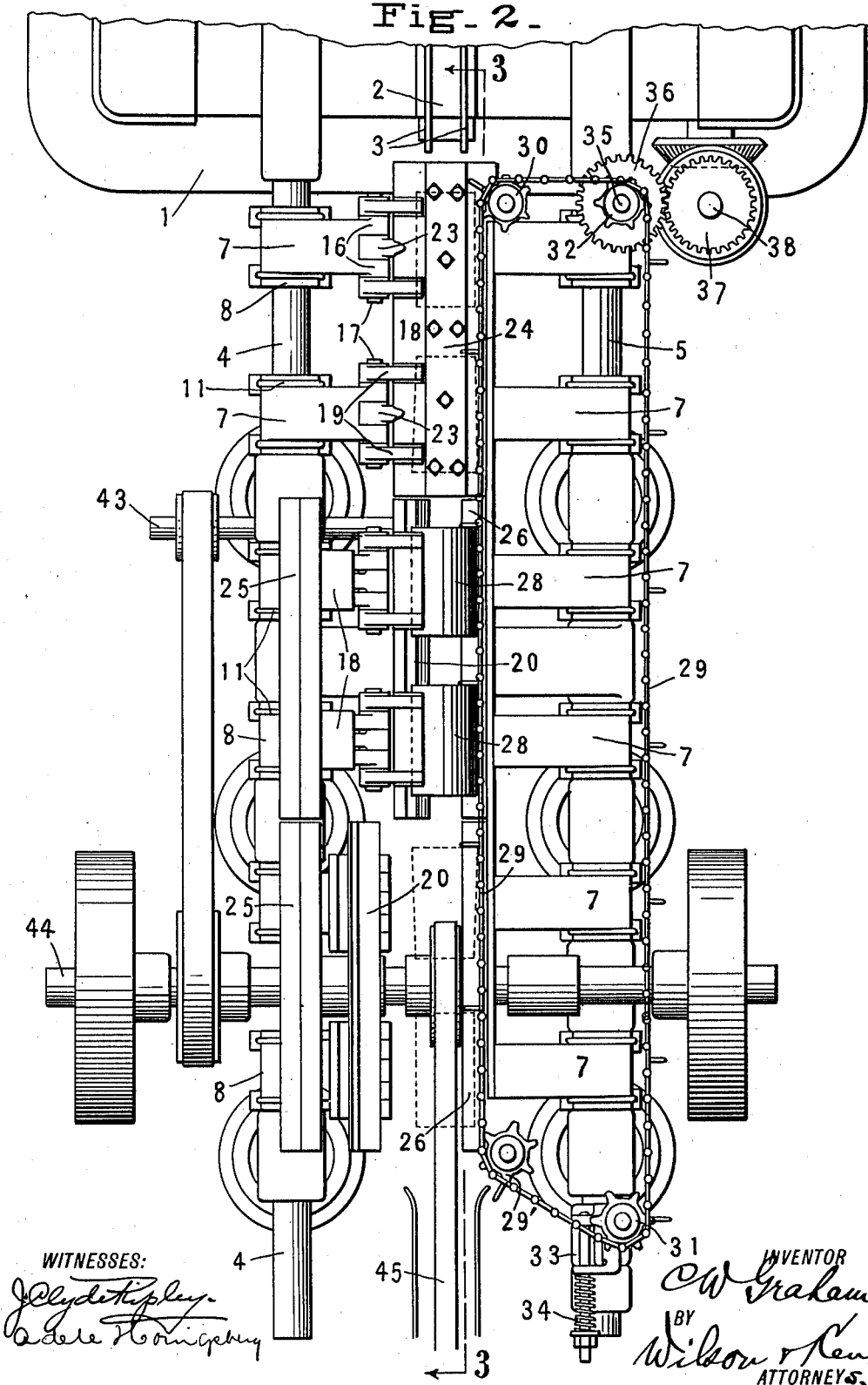
Figure 6:
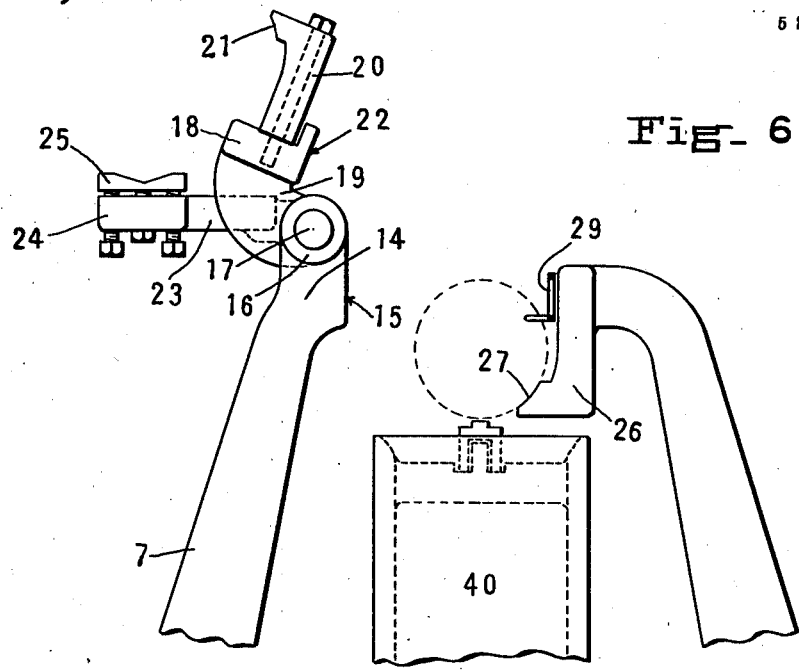
Figure 7:
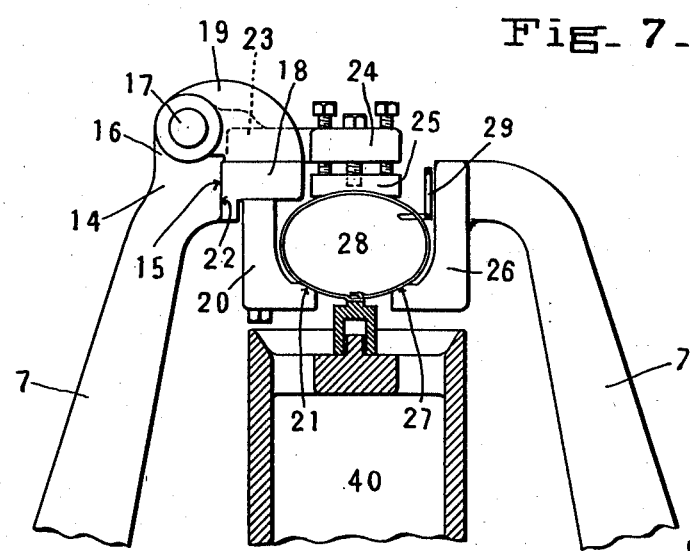

Other objects of the invention, more or less broad than those above stated, will be in part obvious and in part specifically referred to in the course of the following description of the elements, combinations, arrangements of parts and applications of principles constituting the present invention, and the scope of protection contemplated will be indicated in the appended claims.
In the accompanying drawings, which are to be taken as a part of this specification, and in which I have shown a merely preferred form of embodiment of the invention; Figure 1 is a front elevation of a form of my invention, in operative relation to a can body forming machine; Fig. 2 is a top plan view of the same; Fig. 3 is a sectional elevation on the line 3—3 of Fig. 2; Fig. 4 is a detail, showing in end elevation one of the sets of can engaging members and the soldering device; Fig. 5 is a similar view, showing one of the can engaging members in a different position from that which it occupies in Fig. 4; Fig. 6 is a view similar to Fig. 5, showing the parts in a different relation from that of Figs. 4 and 5; and Fig. 7 is a view similar to Fig. 4, the soldering device being in section, of a set of engaging members adapted to hold a can body in altered shape.

Referring to the numerals on the drawings, 1 indicates a can body forming machine, by means whereof a sheet of tin may be brought into the desired shape about a horn, indicated at 2. Reciprocating pusher-bars 3 are operative to discharge the can body in its round shape into the field of other devices, presently to be described.

Having reference now particularly to Figs. 1, 2, and 3, the numerals 4 and 5 indicate a pair of supporting bars, extending longitudinally in horizontal parallelism from the body forming machine 1, and respectively upheld at intervals along their length by vertically adjustable standards 6. Extending upwardly from each of the bars 4 and 5 is a plurality of standards 7, each of which has its lower end formed into a half journal shaped conformably with bars 4 and 5, and extended laterally of the standard as at 8, and for each standard there is a complemental half box 9, having extensions 10 provided with apertures. U bolts 11 on each side of each standard 7 are secured over the extensions 8 and have their ends passed through the apertures of extensions 10 and are secured by means of nuts. It will be evident that by this construction the standards 7 may be angularly adjusted and rigidly secured upon bars 4 and 5. These standards 7 carry the can engaging means about to be described, and for this purpose are arranged on the bars 4 and 5 in opposed pairs, in the illustrated device three distinct pairs on bar 4 being opposed to three pairs on bar 5, each set of opposed pairs making part of a distinct can engaging means, hereinafter described. Inasmuch as there is a general similarity between the several sets, this description will be confined to the pair of standards 7 on bar 4 nearest the horn, and the opposed pair on bar 5, with the parts thereto connected. Each of said standards on bar 4 has a head 14, provided with a vertical face 15, and with upstanding ears 16 thereabove. A pintle 17 passes through these ears and extends laterally on either side of the standards, and a block 18 is provided with ears 19 pivoted upon the pin 17 at the outsides of ears 16. To the blocks 18 of each pair of standards 7 is secured a long contact member or rail 20, horizontally disposed, and having a surface 21 suitable for engagement with the outside of a can body.

The engaging position of member 20 is shown, for instance, in Fig. 4, and it is prevented from moving to the left of the position in said figure by the engagement of the block face 22 with the face 15 of the standard. A strap 23 is hinged upon pin 17 between the ears 16 of each standard 7, and secured to a rail 24 that carries an adjustable contact member or rail 25 of a length equal to that of contact member 20, adapted to engage the upper outside portion of a can body, the engaging position of said member being shown in Fig. 4, for instance. Movement of said member on pivot 17 downwardly from the position indicated in Fig. 4 is prevented by the engagement of strap 23 with the block 18 between ears 19.

Considering now the pair of standards on rod 5 opposite the pair just described, these support fixedly a contact member or rail 26, of length equal to that of rails 20 and 25, and having an engaging surface 27. The various parts are so positioned, as may be seen by references to Figs. 4 to 7, that contact member 20, when in operative position, may engage the outside of a can body 28 at one side thereof near the bottom; contact member 26 may engage it at the other lower side; and contact member 25 may engage it at the upper side. Thus the can body may be practically embraced on all sides, and if it be forced between said rails or contact members its shape will be determined by the disposition and relation of the contact surfaces thereof. It will also be observed that when the parts are in operative position, as in Figs. 4 and 7, there is a space between the adjacent parts of rails 25 and 26, in which space, as hereinafter described, a chain for moving a can body engaged by said rails is effective. There is also a space between the adjacent parts of rails 20 and 26, through which the lower portion of the can body is exposed. By arranging matters so that this exposed surface of the can shall be the seam portion, I am enabled to accomplish the soldering of the seam as hereinafter explained. Finally, it should be noted that the several rails 20, 25, and 26, comprising each of the three can engaging means shown have their ends closely contiguous and are in longitudinal and horizontal alinement, and so also, therefore, are the spaces between them, just referred to.

Referring now to Fig. 2, 29 indicates an endless chain, one course of which is adapted to run in the space between the respectively alined rails 25 and 26, heretofore mentioned. Said chain is provided with fingers properly spaced to engage a can body that may be in position between any set of rails 25, 26, and 20, and as the course of the chain is from the beginning of the first set of rails to beyond the end of the last set, movement thereof will propel a can body while it is engaged by any set of rails, and from one set to a succeeding set. Chain 29 runs around idler sprockets 29' and 30, vertically adjustable on standards secured on rod 5, idler 31, and drive sprocket 32. The idler 31 is movably supported in a block 33, a spring 34 tending to move the idler in a direction to tighten the chain and thereby maintain the latter in operative relation to the can engaging means. Drive sprocket 32 is on the upper end of vertical shaft 35, which is driven through the engagement of a gear 36 thereon with gear 37 on shaft 38, which latter shaft may be driven in any convenient way. A familiar type of molten solder receptacle is indicated at 40, supported from and between rods 4 and 5, and directly below the space between the rails 20 and 26 of the second set of can engaging members. A chain solder applying means runs in this receptacle over an idler 41 and a hexagonal drive pulley 42, the shaft 43 of the latter extending outside the receptacle and being driven by a belt and pulley connection with a shaft 44 supported from rods 4 and 5. As the soldering chain moves in the receptacle it applies solder to the exposed portion of a can body that may be between rails 20, 25, and 26. Obviously the rate of movement of the can body between the rails should be different from that of the soldering element, or they should move in different directions, which may be accomplished by reversing the drive from shaft 44 to shaft 43. Obviously the can body and the soldering element may move both in opposite directions and at different speeds. In the illustrated device, when a can body has been soldered, chain 29 propels it to the third and last set of rails, and as it leaves these it is taken up by an endless conveyer 45, which is driven from shaft 44 and runs forwardly of the machine.

The device as described is obviously well adapted for soldering can seams. The rate of delivery of the formed can bodies from the horn 2 is properly related to the speed of the propelling chain, and the horn, the sets of rails 20, 25, and 26, and the conveyer 45 are in alinement. A can body discharged from horn 2 seam side down, is thrust, end forward, between the rails constituting the first set of can engaging means; by means of chain 29 it is moved forwardly while engaged by the said rails, and then it is moved between the rails of the second set of engaging members. The chain 29 moves it while engaged by these members, and during this period the soldering element applies solder to the seam portion of the can body, which is accessible through the space between rails 20 and 26. The continued operation of the machine now brings the can body between the third set of rails, whereby it may be held while cooling, and thence it is fed to conveyer 45. In case of any interruption of the operation of the machine, as in case a can should become wedged in a set of rails, the pivoted rail 24 carrying the adjustable rail 25 nearest the seat of trouble may be swung up to afford access to the can body and the interior of the can engaging means. When desirable or necessary for any purpose the pivoted rail 20 may also be swung up, as shown in Fig. 6.

The obvious variability in the disposition and relations between the contact surfaces of the rails enables me to adapt the machine to the accomplishment of one of the objects of the invention, which is to provide a machine with a plurality of sets of contact members, by one of which the shape of a can body is gradually altered, by another of which the can body is held in its altered shape during soldering, and by a third set the can body is restored to its original shape. This is accomplished by changing the distance or angular relations between the rails. For instance, in the first set of rails, the engaging surfaces would be spaced about as shown in Fig. 4, supposing that the can body had the round form when discharged from horn 2. Beginning at the ends of the rails near the horn the contact surfaces of rails 20 and 26 gradually diverge toward the other end, while the contacting surface of rail 25 gradually converges toward the other two rails, so that as a can body is moved between the rails by chain 29 it gradually assumes an elliptical form, as indicated by the dotted lines of Fig. 2. In the operation of the machine the chain 29 now carries the can body in its altered shape to the second set of rails, the contact surfaces whereof are alined with each other, so that as the can body is progressed between the same it is simply maintained in its altered shape. While it is so moving the seam, which is exposed through the space between rails 20 and 26, is soldered, as already explained, and the can is moved from this set still in its altered shape, and to the third set of engaging members. The contact surfaces of this third set of rails are arranged and related reversely from the arrangement and relation described with respect to the first set, so that as the can body is moved farther its shape is gradually restored to what it was upon first entering between the rails of the first set of contact members, and in this condition it is taken away by the conveyer.

I desire it understood that I do not limit my claims by the details of construction shown, in which I have simply illustrated one way of embodying the creative part or conception of the invention in concrete form in a structure or machine. The described devices are simply embodiments of the invention which other structures might embody, and some of the parts, as also combinations of parts, might well be used without the others in different types of such machines, without departure from the purview of my invention; and I regard myself as entitled to such variations from the shown and described devices as fall within the scope of my invention as indicated in the claims. It is also to be understood that materials, sizes, and relativities of parts are unimportant, except as they are specified in the claims.

The upper movable or swinging guide rail 25 of each set of guide rails 20, 26, 25 rests by its own gravity and that of its supporting rails 24 and pivotal arms or straps 23 upon the can bodies passing beneath it and supported by the two lower guide rails 20, 26, the weight of these parts being sufficient to change the shape of the can bodies from a round form to an elliptical form or vice versa, as required. The downward movement of the freely movable upper guide rail 25 is limited by engagement of the pivotal straps or arms 23 with the swinging blocks 18 which carry the upwardly movable lower guide rail 20 and the outward movement of which is limited by the interengaging faces or shoulders 15 and 22. The upper movable guide rail 25 resting by gravity upon the can bodies passing beneath it serves not only to distort or change the shape of the can bodies as required but also to hold the can bodies snugly against the movable solder applying and sweating links, blocks or members of the soldering chain which travels between the lower guide rails 20, 26 and parallel thereto and moves in and out of the molten solder in the vessel 40. The soldering chain thus has an effective solder applying and sweating action owing to its sliding contact with the seam of the can and the pressure of the can bodies against the soldering chain under the gravity action of the movable upper guide rail 25. As all three of the guide rails 20, 25 and 26 are mounted upon swinging standards 7, 7, which may be adjusted closer together or farther apart as required, the machine is capable of being quickly adjusted for operation upon can bodies of different diameters. The mounting of the guide rails upon adjustable swinging standard 7, 7 also enables them to be easily and quickly swung down out of the way to give access to other parts of the machine for purposes of repair or renewal.

Having thus described my invention what I claim as new and desire to secure by Letters Patent is:

1. In a device of the kind described, in combination with a can body forming machine, means for ejecting a can body therefrom, means, including a freely movable member, adapted to engage the outside of the can body and hold it with its edges in juxtaposition, and can treating means adapted to act upon the can body while the latter is so held.

2. In a device of the kind described, in combination with a can body forming machine, means for ejecting a can body therefrom, a series of sets of guide rails each set including a pivoted rail and adapted to engage the outside of a can body successively, and progressively to alter the shape of the can body, and means for moving the can body from one to another of said engaging sets of rails.

3. In a device of the kind described, in combination with a can body forming machine, means for ejecting a can body therefrom, a series of sets of guide rails each set including a pivoted rail and alined with said ejecting means adapted to engage the outside of a can body successively, and progressively to alter the shape of the can body, and means for moving the can body from one to another of said engaging sets of rails.

4. In a device of the class described, the combination with solder applying means of means adapted to engage the outside of a can body and hold it with its edges in juxtaposition, comprising a fixed support and a freely movable contact member resting by its own weight on the can bodies.

5. In a device of the class described, means adapted to engage the outside of a can body and hold it with its edges in juxtaposition, comprising a fixed support and a contact member pivoted to freely move.

6. In a device of the class described, means adapted to engage the outside of a can body and hold it with its edges in juxtaposition, comprising a fixed support and a plurality of freely movable contact members resting by their own weight on the can bodies.

7. In a device of the class described, means adapted to engage the outside of a can body and hold it with its edges in juxtaposition, comprising a fixed support and a plurality of contact members pivoted to freely move.

8. In a device of the class described, means adapted to engage the outside of a can body and hold it with its edges in juxtaposition, comprising a pair of alined members, and a member freely movable toward and away from a plane of said members resting by its own weight on the can bodies.

9. In a device of the class described, means adapted to engage the outside of a can body and hold it with its edges in juxtaposition, comprising a pair of alined members normally relatively rigid, and a member freely movable toward and away from a plane of said members resting by its own weight on the can bodies.

10. In a device of the class described, means adapted to engage the outside of a can body and hold it with its edges in juxtaposition, comprising a pair of alined members normally relatively rigid, but having capacity for relative movement, and a member freely movable toward and away from a plane of said members resting by its own weight on the can bodies.

11. In a device of the class described, means adapted to engage the outside of a can body and hold it with its edges in juxtaposition, comprising a pair of alined members and a pivoted member movable freely toward and away from a plane of said members.

12. In a device of the class described, means adapted to engage the outside of a can body and hold it with its edges in juxtaposition, comprising a pair of alined members normally relatively rigid, and a pivoted member movable freely toward and away from a plane of said members.

13. In a device of the class described a plurality of longitudinally disposed members, a freely movable longitudinally disposed member having a surface adapted to contact with a can body, said surface being longitudinally inclined with respect to said other members.

14. In a device of the kind described, a series of alined means for engaging the outside of a can body and holding it with its edges in juxtaposition, each of said means including a longitudinally disposed member having a surface adapted to contact the can body, said surface of one of said members being longitudinally inclined with respect to said other members.

15. In a device of the kind described, a series of alined means for engaging the outside of a can body and holding it with its edges in juxtaposition, each of said means including a longitudinally disposed member having a surface adapted to contact the can body, said surface of one of said members being longitudinally inclined with respect to said other members and means for moving a can body from one to another of said means.

16. In a device of the class described a plurality of longitudinally disposed members, a pivoted and freely movable longitudinally disposed member having a surface adapted to contact a can body, said surface being longitudinally inclined with respect to said other members.

17. In a device of the kind described, a series of alined means for engaging the outside of a can body and holding it with its edges in juxtaposition, each of said means including a longitudinally disposed pivoted member having a surface adapted to contact the can body, said surface of one of said members being longitudinally inclined with respect to said other members.

18. In a device of the kind described, a series of alined means for engaging the outside of a can body and holding it with its edges in juxtaposition, each of said means including a longitudinally disposed pivoted member having a surface adapted to contact the can body, said surface of one of said members being longitudinally inclined with respect to said other members and means for moving a can body from one to another of said means.

19. In a device of the kind described, means adapted to engage the outside of a can body, means for moving the can body, the contact surfaces of said first named means being so disposed that as the can body is moved its shape is gradually altered, a second means adapted to engage the can body and hold it in its altered shape, and a third means adapted to engage the can body in its altered shape and to restore it to its original shape.

20. In a device of the kind described, means adapted to engage the outside of a can body, means for moving the can body, the contact surfaces of said first named means being so disposed that as the can body is moved its shape is gradually altered, a second means adapted to engage the can body and hold it in its altered shape, said last named means adapted to expose a portion of the can body, and a third means adapted to engage the can body in its altered shape and to restore it to its original shape.

21. In a device of the kind described, means adapted to engage the outside of a can body, means for moving the can body, the contact surfaces of said first named means being so disposed that as the can body is moved its shape is gradually altered, a second means adapted to engage the can body and hold it in its altered shape, said last named means adapted to expose a portion of the can body, can treating means adapted to act upon said exposed portion of the can body, and a third means adapted to engage the can body in its altered shape and to restore it to its original shape.

22. In a device of the kind described, means adapted to engage the outside of a can body, means for moving the can body, the contact surfaces of said first named means being so disposed that as the can body is moved its shape is gradually altered, a second means adapted to engage the can body and hold it in its altered shape, and a third means adapted to engage the can body in its altered shape and to restore it to its original shape, said can body engaging means being in alinement.

23. In a device of the kind described, means, including a pivoted member, adapted to engage the outside of a round can body, means for moving the can body, the contact surfaces of said first named means being so disposed that as the can body is moved it is gradually brought to an elliptical shape, and a second means, including a pivotal member, adapted to engage the can body and hold it in its elliptical shape, said can body moving means being operative to move the can body from said first named engaging means to said second named engaging means.

24. In a device of the kind described, means including a pivoted member adapted to engage the outside of a round can body, a second means, including a pivoted member, adapted to engage the outside of an elliptical can body, means for moving the can body, the contact surfaces of said first named means being so disposed that as the can body is moved it is gradually brought to an elliptical shape, a third means, including a pivoted member, adapted to engage the can body and change its elliptical shape to a round form, said can body moving means being operative to move the can body from said first named engaging means to said second named engaging means to said last named means.

25. In a device of the kind described, means, including a pivoted member, adapted to engage the outside of a round can body, means for moving the can body, the contact surface of said first named means being so disposed that as the can body is moved it is gradually brought to an elliptical shape, and a second means, including a pivoted member, adapted to engage the can body and hold it in its elliptical shape, said can body moving means being operative to move the can body from said first named engaging means to said second named engaging means, said can engaging means being in longitudinal alinement.

26. In a device of the kind described, means including a pivoted member, adapted to engage the outside of a round can body, means for moving the can body, the contact surfaces of said first named means being so disposed that as the can body is moved it is gradually brought to an elliptical shape, a second means, including a pivoted member, adapted to engage the can body and hold it in its elliptical shape, said can body moving means being operative to move the can body from said first named engaging means to said second named engaging means, and a third means, including a pivoted member, for engaging the can body while in its elliptical shape, said can body moving means being operative to move the can body from said second named engaging means to said last named means, and to move it while engaged by said last named engaging means, the contact surfaces of said last named engaging means being so disposed that as the can body is moved it is gradually restored to its round form, said can engaging means being in longitudinal alinement.

27. In a device of the kind described, means, including a pivoted member, adapted to engage the outside of a round can body, means for moving the can body, the contact surfaces of said first named means being so disposed that as the can body is moved it is gradually brought to an elliptical shape, a second means, including a pivoted member adapted to engage the can body and hold it in its elliptical shape, said can body moving means being operative to move the can body from said first named engaging means to said second named engaging means, said can engaging means being adapted at all times to expose a portion of the outside of the can body.

28. In a device of the kind described, means including a pivoted member, adapted to engage the outside of a round can body, means for moving the can body, the contact surfaces of said first named means being so disposed that as the can body is moved it is gradually brought to an elliptical shape, a second means, including a pivoted member, adapted to engage the can body and hold it in its elliptical shape, said can body moving means being operative to move the can body from said first named engaging means to said second named engaging means, and a third means, including a pivoted member, for engaging the can body while in its elliptical shape, said can body moving means being operative to move the can body from said second named engaging means to said last named means, and to move it while engaged by said last named engaging means, the contact surfaces of said last named engaging means being so disposed that as the can body is moved it is gradually restored to its round form, said can engaging means being adapted at all times to expose a portion of the outside of the can body.

29. In a device of the kind described, means, including a pivoted member, adapted to engage the outside of a round can body, means for moving the can body, the contact surfaces of said first named means being so disposed that as the can body is moved it is gradually brought to an elliptical shape, and a second means, including a pivoted member, adapted to engage the can body and hold it in its elliptical shape, said can body moving means being operative to move the can body from said first named engaging means to said second named engaging means, said can engaging means being in longitudinal alinement, and adapted at all times to expose a portion of the outside of the can body.

30. In a device of the kind described, means, including a pivoted member, adapted to engage the outside of a round can body, means for moving the can body, the contact surfaces of said first named means being so disposed that as the can body is moved it is gradually brought to an eliptical shape, a second means, including a pivoted member, adapted to engage the can body and hold it in its elliptical shape, said can body moving means being operative to move the can body from said first named engaging means to said second named engaging means, and a third means, including a pivoted member, for engaging the can body while in its elliptical shape, said can body moving means being operative to move the can body from said second named engaging means to said last named means, and to move it while engaged by said last named engaging means, the contact surfaces of said last named engaging means being so disposed that as the can body is moved it is gradually restored to its round form, and said can engaging means being in longitudinal alinement.

31. In a device of the kind described, means, including three guide rails, one freely movable in respect to the other two and all relatively arranged and adapted to engage the outside of a can body and hold the portion of the body in which the same is positioned in a temporarily flattened condition.

32. In a device of the kind described, means, including a movable member, adapted to engage the outside of a can body and bring the portion of the body in which the seam is positioned into a temporarily flattened condition, and a second means, including a movable member, for holding the can body in its altered shape.

33. In a device of the kind described, means, including a movable member, adapted to engage the outside of a can body and bring the portion of the body in which the seam is positioned in a temporarily flattened condition, and a second means, including a movable member, for holding the can body in its altered shape, said means being adapted to expose a portion of the outside of the can body.

34. In a device of the kind described, means, including a movable member, adapted to engage the outside of a can body and bring the portion of the body in which the seam is positioned into a temporarily flattened condition, a second means, including a movable member, for holding the can body in its altered shape, said means being adapted to expose a portion of the outside of the can body, and can treating means adapted to act upon the exposed surface of the can body.

35. In a device of the kind described, means, including a movable member, adapted to engage the outside of a can body and bring the portion of the body in which the seam is positioned into a temporarily flattened condition, a second means, including a movable member, for holding the can body in its altered shape, said means being adapted to expose a portion of the outside of the can body, and can treating means adjacent said second named means adapted to act upon the exposed surface of the can body.

36. In a device of the kind described, the combination with solder applying means, of a plurality of contact members, one of said contact members being freely movable, and an adjustable piece carried by said freely movable contact member.

37. In a device of the kind described, the combination with solder applying means of a pair of horizontally spaced supports below said solder applying means, angularly adjustable standards extending upwardly therefrom above and on each side of said solder applying means, and can body engaging members secured to said standards respectively said angularly adjustable standards and said can body engaging members carried thereby being adapted to swing bodily away from said solder applying means.

38. In a device of the kind described, a series of sets of contact members, the members of each set adapted to engage respectively different portions of the outside surface of a can body, and means for moving the can body from one to another of said sets and while it is engaged by them, the contact surfaces of the members of one set being so related that as the can body is moved during engagement with said members its shape is altered, and the contact surfaces of the members of a succeeding set being so related that as the can body is moved during engagement thereby it is maintained in such altered shape.

39. In a device of the kind described, a series of sets of contact members, the members of each set adapted to engage respectively different portions of the outside surface of a can body, and means for moving the can body from one to another of said sets and while it is engaged by them, the contact surfaces of the members of one set being so related that as the can body is moved during engagement with said members its shape is altered, and the contact surfaces of the members of a succeeding set being so related that as the can body is moved during engagement thereby it is maintained in such altered shape, and the contact members of a succeeding set being so related that as the can body is moved during engagement thereby its shape is again altered.

40. In a device of the kind described, a series of sets of contact members, the members of each set adapted to engage respectively different portions of the outside surface of a can body, and means for moving the can body from one to another of said sets and while it is engaged by them, the contact surfaces of the members of one set being so related that as the can body is moved during engagement with said members its shape is altered, and the contact surfaces of the members of a succeeding set being so related that as the can body is moved during engagement thereby it is maintained in such altered shape, and can treating means adapted to act upon the can body while engaged by said second named set of members.

41. In a can body making machine, the combination with a pair of lower can body supporting guide rails spaced apart and externally engaging the can bodies, of an upper freely movable guide rail, swinging arms carrying said movable guide rail, a molten solder receptacle below said guide rails, and a movable solder applying and sweating chain in said molten solder receptacle and having a sliding contact with the seams of the can bodies, substantially as specified.

42. In a can body making machine, the combination with a molten solder receptacle and solder applying and sweating means therein, of a pair of lower guide rails spaced apart and externally engaging the can bodies, an upper movable guide rail externally engaging the can bodies and hinged arms carrying said upper movable guide rail and adapting it to be swung back out of the way, substantially as specified.

43. In a can body making machine, the combination with a pair of lower guide rails spaced apart, of an upper movable guide rail and pivotal arms carrying said upper movable guide rail, substantially as specified.

44. In a side seam soldering machine, the combination with a pair of lower guide rails externally engaging the can bodies, hinged supports for one of said rails adapting it to be swung back out of the way, and an upper movable guide rail externally engaging the can bodies and having hinged supports adapting it to be swung back out of the way, substantially as specified.

45. In a side seam soldering machine, the combination with a pair of lower guide rails spaced apart and externally engaging the can bodies, of an upper guide rail externally engaging the can bodies and upwardly extending pivotal standards supporting said lower guide rails and adapting them to be adjusted to and from each other and swung out of the way, substantially as specified.

46. In a side seam soldering machine, the combination with a pair of lower guide rails spaced apart and externally engaging the can bodies, of an upper guide rail externally engaging the can bodies and upwardly extending pivotal standards supporting said lower guide rails and adapting them to be adjusted to and from each other and swung out of the way, one of said lower guide rails having a hinge connection with its said pivotal standards, substantially as specified.

47. In a side seam soldering machine, the combination with a pair of lower guide rails spaced apart and externally engaging the can bodies, of an upper guide rail externally engaging the can bodies and upwardly extending pivotal standards supporting said lower guide rails and adapting them to be adjusted to and from each other and swung out of the way, one of said lower guide rails having a hinge connection with its said pivotal standards, said upper guide rail having arms hinged to the adjustable standards supporting one of said lower guide rails to enable said upper guide rail to be swung out of the way, substantially as specified.

48. In a soldering machine, the combination of a pair of lower guide rails spaced apart and externally engaging the can bodies and an upper freely movable guide rail externally engaging the can bodies and held in its normal working position by gravity, substantially as specified.

49. In a soldering machine, the combination of a pair of lower guide rails spaced apart and externally engaging the can bodies and an upper freely movable guide rail externally engaging the can bodies and held in its normal working position by gravity, said upper movable guide rail having its can body engaging surface longitudinally inclined in respect to the plane of the other two guide rails, substantially as specified.

In witness whereof, I affix my signature in the presence of two witnesses.

CHARLES W. GRAHAM.

Witnesses:
F. B. BEERS,
D. D. JACKSON.